2 Sheets—Sheet 1.

S. W. WOOD.

MACHINES FOR PATCHING BULLETS.

No. 7,655. Reissued May 1, 1877.

Witnesses,

A. G. Hyde

G. M. Hebard

Inventor.

S. W. Wood

N. PETERS, PHOTO-LITHOGRAPHER, WASHINGTON, D. C.

2 Sheets—Sheet 2.

S. W. WOOD.

MACHINES FOR PATCHING BULLETS.

No. 7,655. Reissued May 1, 1877.

Witnesses,

A. G. Hyde

G. W. Ketcham

Inventor.

S. W. Wood.

N. PETERS, PHOTO-LITHOGRAPHER, WASHINGTON, D. C.

UNITED STATES PATENT OFFICE.

STEPHEN W. WOOD, OF CORNWALL, NEW YORK.

IMPROVEMENT IN MACHINES FOR PATCHING BULLETS.

Specification forming part of Letters Patent No. 136,352, dated February 25, 1873; reissue No. 7,655, dated May 1, 1877; application filed October 4, 1875.

*To all whom it may concern:*

Be it known that I, STEPHEN W. WOOD, of Cornwall, county of Orange, and State of New York, have invented a Machine for and the Process of Patching Bullets; and I do hereby declare that the following is a description thereof, reference being had to the accompanying drawings, making part of this specification.

My method of patching a bullet is by revolving the same in contact with a patch, and one practical method of effecting the object is illustrated in the accompanying drawing, of which—

Figure 1 is a side elevation of a machine, the table upon which to hold the patches being removed; Fig. 2, a vertical cross-section through the line *x x* of Fig. 1; Fig. 3, a plan of two rollers and feed-bar detached and representing bullets, respectively, in position before, while, and after having been patched; Fig. 4, a detached view of the opening and closing or approaching jaws or surfaces for gathering or folding the patch over or around the end of the bullet, with a sectional view, in part, of the rollers by which the bullet is revolved against the patch. Figs. 5 5′ are detached views of guides for directing the patch around the bullet, with a sectional view, in part, of the rollers. Figs. 6, 7, 8 are views of several modifications of devices, differing from the approaching or converging jaws in Fig. 4, by which the patch may be folded or gathered over or around the end of a bullet; Fig. 9, a plan of the two lower rollers for revolving a bullet to receive a patch, with a device for moistening the bullet to receive a patch; Fig. 10, a vertical cross-section, showing the same device as in Fig. 9; Fig. 11, a plan of the lower rollers and a device for moistening the patch before it is wrapped around a bullet; Fig. 12, a vertical cross-section, showing the same device as in Fig. 11.

My invention relates to automatically wrapping a patch around a bullet by means of a roller or rollers, by which a bullet is revolved while receiving a patch; also, in machinery for patching bullets, the contrivance of approaching or converging jaws or surfaces, or their equivalents, by which the projecting end of a patch is folded, gathered, or crimped over or around the end of a bullet; also, in machinery for patching bullets, moistening or partially moistening with water, or any suitable glutinous substance, either the bullet that the patch may adhere thereto in its revolutions, or moistening or partially moistening with water, or any suitable glutinous substance, a patch that it may adhere to the bullet while revolving in contact therewith to receive it; also, in machinery for patching bullets, first wrapping a patch around a bullet, and subsequently moistening the same, for the purpose herein specified.

A in the accompanying drawing represents a frame, upon which are mounted the various working parts constituting one form of mechanism for patching a bullet automatically, and consists of rollers B B, placed at the required distance apart, upon which the bullet to be patched is placed. C is an upper roller, movable and self-adjusting, which is first raised to admit the bullet to the position to receive the patch, and is then lowered, resting upon the upper side thereof, embracing the bullet between the three rollers or rotating surfaces.

The bullet R now being in position, as shown in Figs. 2, 3, proper motion is given to the rollers B B and C by means of cog-wheels G G and H, turning the bullet in the direction indicated by the arrows, and in its revolutions receives the patch.

The patch to be wrapped around the bullet is now fed through a guide, I, secured to the table J, and its end or edge presented to the point of contact between the surface of the bullet and face of the roller C.

To direct the end of this patch so that it shall follow and be wrapped around the bullet as it (the bullet) rotates by means of the rollers B B and C, a guide, K, is placed between these rollers in grooves *c c*, and secured to the bed A.

This guide K is placed between the rollers B B and C, and its inner periphery *e* is tangent to or nearly so to the surface of these rollers, so that the bullet, when placed upon the two lower rollers, and moved forward by the sliding bar W, may pass into this circular guide K, and remain therein until patched, the inner periphery *e* directing the patch around the bullet, and the three rollers conjointly wrapping the patch tightly around the surface thereof.

The bullet now having its patch wrapped around it with a sufficient portion of the patch extending over the end thereof, the adjustable and converging or approaching jaws O are caused to approach each other, thereby folding or gathering the extending end of said patch over and around the end of the bullet, as shown in Fig. 3, position 2.

These adjustable jaws or surfaces are placed in the grooves *c' c'*, the first series formed in the several rollers, and through which the bullet passes in its movements forward to position 2, encircling the patch immediately in the rear of the end of the bullet.

These adjustable jaws or surfaces are pivoted at *s*, and closed to gather or fold the patch over or around the end of the bullet by means of the cam *t*, and opened to permit the succeeding bullet to pass through, by means of a spring or rubber, *u*, secured to the lower arms *p*; or they may be operated by any equivalent means.

Small indentations *r* are formed in the inner faces of these jaws centrally, so that the gathered end of the patch may extend through between them, or the inner approaching faces *x* may be plain, so as to flatten the patch upon the end of the bullet after having been gathered around it.

To retain the bullet in position, and to prevent the patch slipping forward while being gathered or folded over its end, grooves *d* are formed in the rollers, as shown in Fig. 1, and a stop, P, may be secured to the movable roller C, against which the front end of the bullet may bear, and which is raised, with the roller C, to allow the patched bullet to move forward, as shown in dotted lines.

A second stop, P', is also secured to the roller C, which retains the patched bullet in position while being moistened to shrink the patch thereon.

The bullet now having received its patch, the upper roller C is raised, when the feed-bar W moves forward, presenting another bullet to the guide K in position to receive its patch, and the preceding patched bullet being moved forward at the same time to position 3, Fig. 3, to be moistened in any convenient manner, and then delivered from between the rollers by the third succeeding bullet being moved forward to receive its patch.

One practical method of moistening the patch is represented in Fig. 5, viz., by immersing, or partly immersing, division *n* of the sectional rollers B B in water or suitable glutinous substance, which, in their revolutions, will sufficiently dampen the patch.

To prevent the patch being moistened (by the patched bullet) so as to adhere to the rollers in the act of being wrapped around the bullet, grooves *i i* are formed in these rollers, so as to disconnect and separate the moistened section or division *n* from division *m*, by which the patch is wrapped around the bullet. When the bullet is to be moistened by water or any suitable glutinous substance, that the patch may adhere thereto while being wrapped around, a wheel, *b*, Fig. 10, is placed in the grooves *c c*, and pressed against the bullet instead of or in conjunction with the guide K, its lower edge, or an intermediate roller, D, being immersed in the liquid to be used, and when rotated by means of the friction of the bullet, turned by the rollers B B and C, or otherwise, a narrow belt of moisture is laid around the bullet, to which the patch adheres, thus carrying it around with and securing it to the surface of the bullet.

A strip of moisture, by water or glue, may be laid or rolled upon the lower surface of the patch, as in Fig. 11, if preferred, instead of moistening the bullet.

Guide-rollers *g* may be employed to direct the patch around the bullet instead of the circular guide K, if preferred.

It is evident that a greater number of rollers might be used, if desired, and that various modifications in mechanism for folding or gathering the patch over or around the end of the bullet might be substituted in place of the adjustable or approaching jaws O, some of which are represented in the accompanying drawing, Fig. 6, being rollers *m' m'* moving laterally or at right angles to the end of the bullet. This figure represents the rollers in position previous to and after having gathered or folded the patch over or around the bullet.

Figure 1:
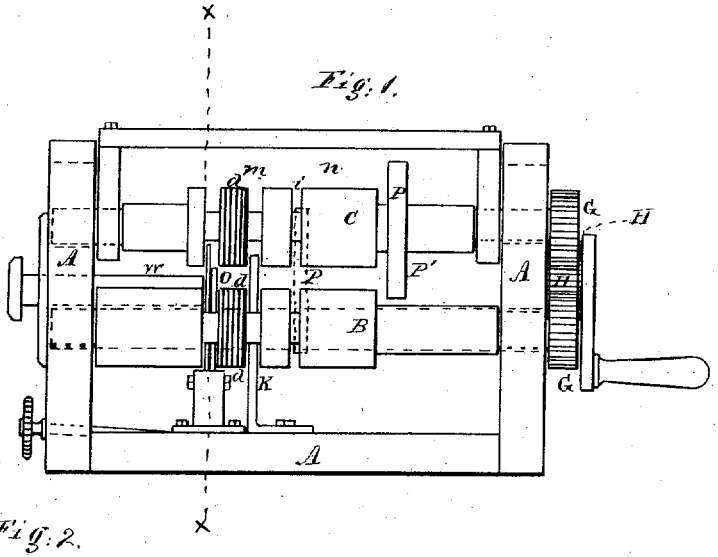
Figure 2:
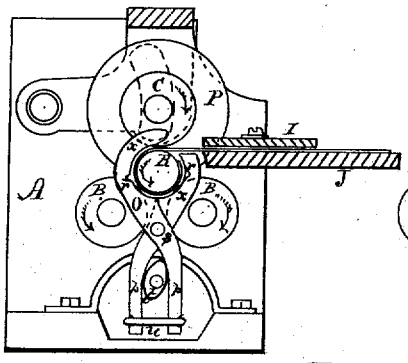
Figure 5:
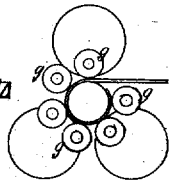
Figure 4:
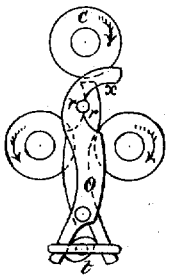
Figure 3:
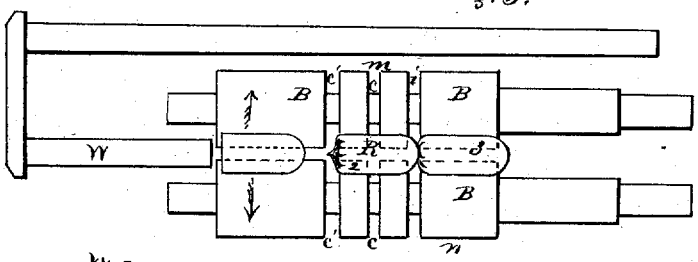
Figure 5:
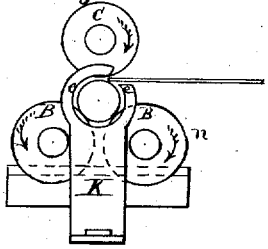
Figure 8:
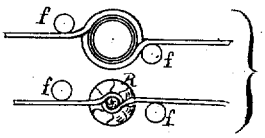
Fig. 8 represents a coiled wire which surrounds the patch, and, to fold or gather it around the bullet, is drawn laterally to the bullet through guide-pins *f*, thereby gradually closing the patch, as in Figs. 2 and 4.
Figure 7:
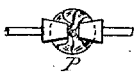
Fig. 7 represents two conical rollers to perform the same office.
Figure 6:
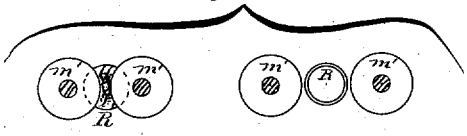
Figure 9:
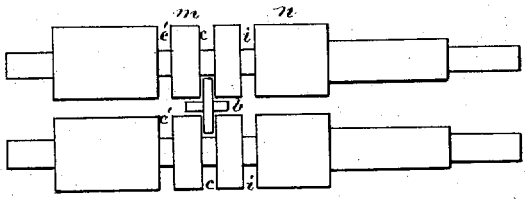
Figure 11:
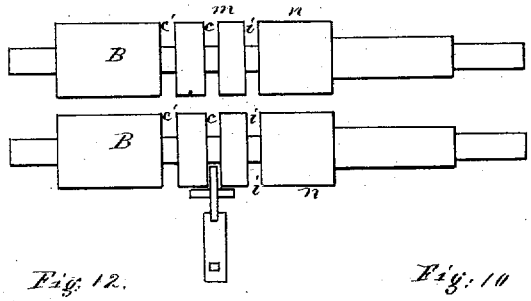
Figure 12:
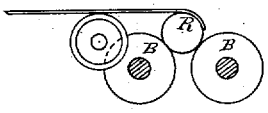
Figure 10:
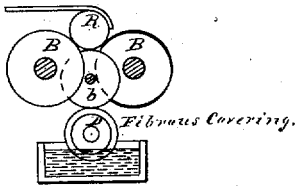

Having described my invention, what I claim therein as new, and desire to secure by Letters Patent, is—

1. Combined with rollers for wrapping a patch around a bullet, substantially in the manner herein set forth, folding jaws for automatically folding, gathering, or closing the patch over or around the end of the bullet, in the manner described.

2. A guide, in combination with a series of rollers, for directing the patch around the bullet, constructed and arranged substantially as herein described.

3. The process herein described of patching bullets, consisting in rolling strips of paper upon the bullets, and afterward dampening or moistening the same and allowing them to shrink upon the bullets, as described and set forth.

4. In a machine for patching bullets, one or more revolving cylinders or surfaces for giving rotation to the bullets while the patches are being wound upon the same.

STEPHEN W. WOOD.

Witnesses:
GEO. SMITH,
E. S. HYDE.